United States Patent
Lai

(10) Patent No.: US 6,667,241 B2
(45) Date of Patent: Dec. 23, 2003

(54) PROCESS FOR MANUFACTURING REFLECTIVE TFT-LCD WITH SLANT DIFFUSERS

(75) Inventor: Han-Chung Lai, Jung Li (TW)

(73) Assignee: Au Optronics Corp., Hsinchu (TW)

( * ) Notice: Subject to any disclaimer, the term of this patent is extended or adjusted under 35 U.S.C. 154(b) by 144 days.

(21) Appl. No.: 09/984,694

(22) Filed: Oct. 31, 2001

(65) Prior Publication Data

US 2002/0151178 A1 Oct. 17, 2002

(30) Foreign Application Priority Data

Apr. 4, 2001 (TW) ........................................ 90108217 A

(51) Int. Cl.⁷ ............................................. H01L 21/311
(52) U.S. Cl. ........................................ 438/694; 438/197
(58) Field of Search ................................. 438/197, 680, 438/681, 694, 695, 699, 702, 703, 704, 954, 958

(56) References Cited

U.S. PATENT DOCUMENTS 5,995,188 A * 11/1999 Shimizu et al. .............. 349/147
6,097,464 A * 8/2000 Liu ............................ 349/130
6,433,842 B1 * 8/2002 Kaneko et al. ............... 349/43

* cited by examiner

Primary Examiner—David Nhu
(74) Attorney, Agent, or Firm—Troxell Law Office PLLC

(57) ABSTRACT

A method of forming a TFT-LCD device with a rough pixel electrode is disclosed. The method comprises the following steps. First, a first metal layer is formed on a substrate. And a first etching procedure is done to etch the first metal layer for defining a gate structure and plural ridge bumps on the substrate. Each the ridge bump has a long bevel and a short bevel. Next a first insulating layer is formed on the gate structure, the plural ridge bumps and the substrate wherein the insulating layer deposited on the long bevel has a long inclined plane and on the short bevel has a short inclined plane. Then a semiconductor layer is formed and patterned on the first insulating layer above the gate structure to serve as channels. And a second insulating layer is deposited on the semiconductor layer and the first insulating layer. A second etching procedure is done to etch the second insulating layer to define an etching stopper above the gate structure. Subsequently a second metal layer is formed thereon and a third etching procedure is done then to etch the second metal layer to define drain/source structures aside the etching stopper. After forming and patterning a passivation layer on the drain/source structures, a pixel electrode is then formed on the passivation layer.

19 Claims, 5 Drawing Sheets

PROCESS FOR MANUFACTURING REFLECTIVE TFT-LCD WITH SLANT DIFFUSERS

FIELD OF THE INVENTION

The present invention relates to a process for manufacturing TFT liquid crystal displays and, more specifically, to a process for manufacturing pixel electrodes with slant diffusers for serving as the reflection members of TFT-LCD devices.

BACKGROUND OF THE INVENTION

With the advance of techniques for manufacturing thin-film transistors, the liquid crystal displays (LCD) are widely applied in electrical products, such as PDAs, laptops, cellphones, high resolution television sets, etc. due to advantages as smaller size, portability, and lower power consumption. Particularly the up-to-date reflective LCD device is usually performed by utilizing the reflection of light incident from outside, wherein the pixel electrodes made of metal materials are applied to serve as reflection members. Thus the light reflected form the pixel electrodes performs desired images on the displays through liquid crystal molecules and color filters. The reflective type liquid crystal display that does not require a backlight has been vigorously developed because this type of displays is power saving, thin and lightweight. In addition, since members for the backlight are not necessary, the cost may be reduced.

Notedly, the deeply concerned and important key point is how to promote efficiency of light reflection because the light source of the reflective type LCD comes from the external illumination. In prior art, polarizing plates are introduced to adjust the phases of incident lights for increasing reflection intensity. However, it is not practical to apply the additional polarizing plates into the reflective type LCD. Another solution is to fabricate the pixel electrodes with rough surface for serving as the reflection diffusers for completely utilizing external illuminations, promoting efficiency of reflections and increasing contrasts.

Please refer to FIG. 1, the cross-sectional view of TFT-LCD with rough reflection fabricated by prior art is shown. The related process comprises follow steps. A gate structure 12 is defined on a glass substrate 10 first. Then an insulating layer 14 is deposited on surfaces of the gate structure 12. A semiconductor layer 16 such as amorphous silicon, a doped silicon layer 18 and a metal layer are sequentially formed on the gate structure 12. Next a photolithography procedure is performed to define a drain structure 20 and a source structure 22. After the TFT-LCD 24 is fabricated, an additional step is performed to form plural bumps 26 made of photoresists in the areas where applied to define pixel electrodes. Next a passivation layer 28 such as polymer material is coated on the bumps 26. And a pixel electrode 30 is formed above those layers. Thus, the reflection efficiency can be promoted due to the pixel electrode 30 having a rough and uneven surface.

However, for forming the bumps 26, it is necessary to deposit a photoresist layer on the glass substrate 10 first and perform the lithography, developing, and baking steps for defining bump patterns. It is required to fabricate an additional reticle applied to the above procedures. Therefore the cycle time is prolonged and the throughput is reduced cause the additional photomask and related lithography steps.

Besides, though the bumps 26 shown in FIG. 1 can be applied to increase the light receiving efficiency of the reflection member from outside illuminations. The brightness is still limited cause that the angles and ranges of reflected lights from the diffusers are not regulated and normalized. Accordingly how to manufacture the TFT-LCD devices with rough electrodes without the additional reticle and how to gather up the reflected lights within the possible view angles for users are the most important issues nowadays.

SUMMARY OF THE INVENTION

The first objective of the present invention is to provide a method for manufacturing a TFT-LCD device having pixel electrodes with rough surfaces for increasing the intensity of reflected lights.

The second objective of the present invention is to provide a method of forming pixel electrodes with the required angles of reflection wherein plural ridge bumps are defined to make the most outside illuminations can be reflected along the predetermined angles.

The third objective of the present invention is to provide a method of defining pixel electrodes with slant and rough surface for serving as diffusers.

A method of forming a TFT-LCD device with a slant pixel electrode for serving as the diffuser member is disclosed. In the first embodiment, the method comprises the following steps. First, a first metal layer is formed on a substrate. And a first etching procedure is done to etch the first metal layer for defining a gate structure. Notedly, the halftone reticle and slit reticle can be applied to define the slant photoresist patterns for defining plural ridge bumps of first metal layer simultaneously when the gate structure is defined. Each the ridge bump has a first bevel and a second bevel. Next a first insulating layer is formed on the gate structure, the plural ridge bumps and the substrate wherein the first insulating layer along the first bevel has a first inclined plane and along the second bevel has a second inclined plane. Then a semiconductor layer is formed on the first insulating layer above the gate structure to serve as channels. And a second insulating layer is deposited and etched by a second etching procedure to define an etching stopper above the gate structure. Subsequently a second metal layer is formed thereon and a third etching procedure is done then to etch the second metal layer to define drain/source structures aside the etching stopper. Next a passivation layer is formed on the drain/source structures and the first insulating layer, wherein the passivation layer is etched to expose a portion of the drain/source structures. A pixel electrode is then formed on the passivation layer.

In the second embodiment of the present invention, plural insulating protrusions are defined on the ridge bumps simultaneously when the second etching procedure is performed to etch the second insulating layer wherein the insulating protrusions are distributed along the first inclined plane of the first insulating layer. Thus the pixel electrode deposited latter can duplicate the shapes of the ridge bumps and protrusions to form the rough and uneven diffusers.

Similarly in the third embodiment, plural metal protrusions are defined above the ridge bumps when the third etching procedure is performed to etch the second metal layer simultaneously wherein the metal protrusions are distributed along the first inclined plane. Thus the pixel electrode with the rough and uneven diffusers can be served as the diffuser members.

And in the fourth embodiment, the metal protrusions and the insulating protrusions are both fabricated on the first inclined plane for highly concentrated roughness. Of cause these protrusions can also be applied along both the first and second inclined plane to promote the reflection efficiency.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

A method is disclosed hereinafter to manufacture the TFT-LCD devices with slant pixel electrodes that are served as diffusers. Plural ridge bumps are formed simultaneously in the areas for defining the pixel electrodes when the procedures of defining the thin-film transistor are performed. Thus the pixel electrodes can duplicate the uneven surface from the ridge bumps beneath. And the roughness of the pixel electrodes can be promoted by applying the insulating and metal protrusions on the ridge bumps to increase the reflect efficiency of the illumination. Accordingly the films deposited latter such as the passivation layer and the pixel electrodes can duplicate the rough and uneven shapes of those bumps and protrusions. The detailed description is given as following.

Figure 1:
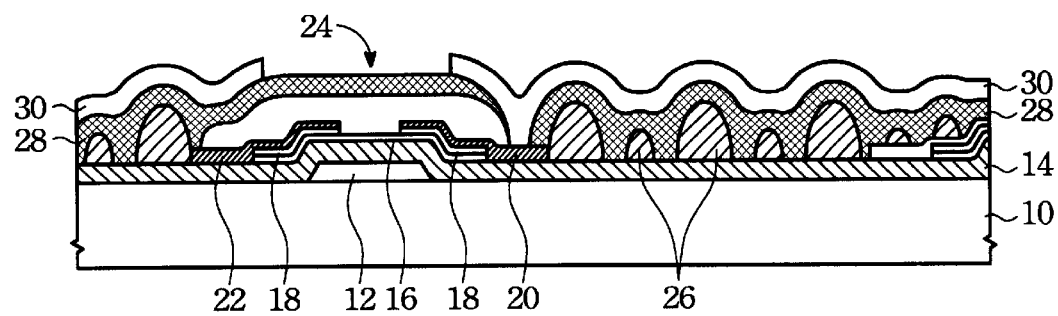
FIG. 1 is a cross sectional view of a transparent substrate illustrating the TFT-LCD device which have rough reflection members in accordance with the prior art.
Figure 2:
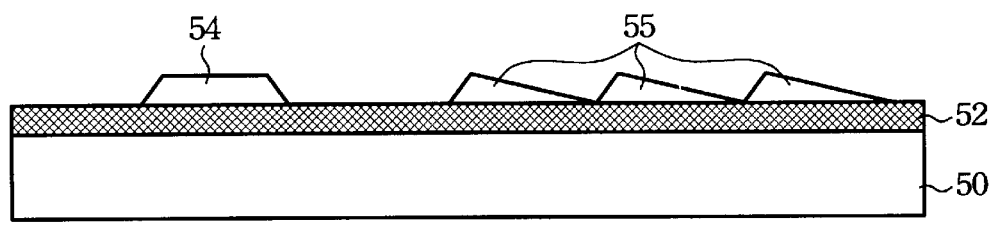
FIG. 2 is a cross sectional view of a transparent substrate illustrating the step of forming the first metal layer and defining the photoresist with ridge shapes thereon in accordance with the present invention.

The First Embodiment:

Refer to FIG. 2, in the first embodiment of the present invention a first metal layer 52 is formed on a transparent insulator substrate 50 by performing a PVD procedure such as sputtering. The substrate 50 is preferably made of a glass, quartz, or the likes. And the first metal layer 52 can be chosen from the group of aluminum(Al), titanium(Ti), chromium(Cr), tungsten(W), tantalum(Ta), alloy and any combination thereof. Then a first etching procedure such as the reactive ion etching (RIE) is performed to etch the first metal layer 52 for defining a gate structure 54 and plural ridge metal bumps 58 simultaneously on the substrate 50. In a preferred embodiment, a photoresist layer is coated on the first metal layer 52 first. And the photoresist layer is defined by exposing and developing procedures to form the photoresist bumps 54, 55 on the first metal layer 52. Then the photoresist bump 54 is applied to serve as an etching mask for defining a gate pattern, and the photoresist bumps 55 with the slant ridge shapes are applied for defining the ridge metal bumps 58.

In general the half tone reticle, the slit reticle can be applied to define the slant ridge photoresist bumps 55. And other method such as the multi-exposure process can also be applied to define the slant photoresist patterns. Noted that the ridge bumps 58 are defined in the area where is predetermined to fabricate pixel electrodes later. And each ridge bump 58 has a long bevel 58a and a short bevel 58b. As well known, capacitor storage electrodes, data lines and scan lines (all not illustrated) are defined on the substrate 50 simultaneously when the first etching procedure is done to define the gate structures 56.

Figure 3:
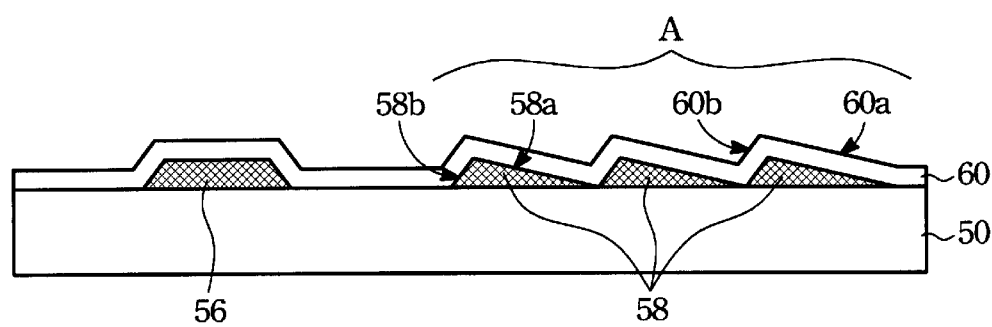
FIG. 3 is a cross sectional view of a transparent substrate illustrating the step of defining the gate structure and the plural ridge bumps in accordance with the present invention.

After the residual photoresist bumps 54, 55 are completely removed, as illustrated in FIG. 3, a first insulating layer 60 is deposited on the gate structure 56, the ridge bumps 58, and the substrate 50. The first insulating layer 60 deposited along the long bevels 58a of the ridge bump 58 has a long inclined plane 60a and along the short bevel 58b has a short inclined plane 60b. In general, the first insulating layer 60 can be chosen from the group of oxide, nitride, oxynitride, or other likes. In a preferred embodiment, the first insulating layer 60 is formed of silicon oxide layer by applying a plasma enhanced chemical vapor deposition (PECVD) process.

Figure 4:
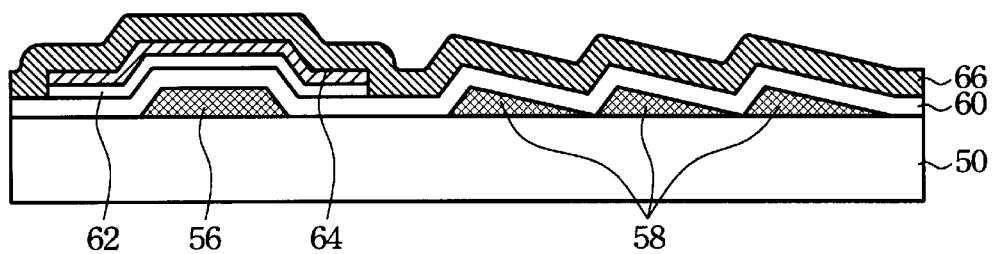
FIG. 4 is a cross sectional view of a transparent substrate illustrating the steps of forming the first insulating layer, the gate insulating layer, the semiconductor layer and the second insulating layer sequentially in accordance with the present invention.

Please refer to FIG. 4, after depositing the first insulating layer 60, a gate insulating layer 62 and a semiconductor layer 64 are deposited on the first insulating layer 60 in sequence. Then the semiconductor layer 64 and the gate insulating layer 62 are etched to define a channel pattern above the gate structure 56 and to expose surfaces of the first insulating layer 60. The gate insulating layer 62 is preferred made of nitride or likes. And material such as amorphous silicon can be applied to form the semiconductor layer 64 for defining the channels of TFT devices latter. Then a second insulating layer 66 is formed to cover the semiconductor layer 64 and the first insulating layer 60.

Figure 5:
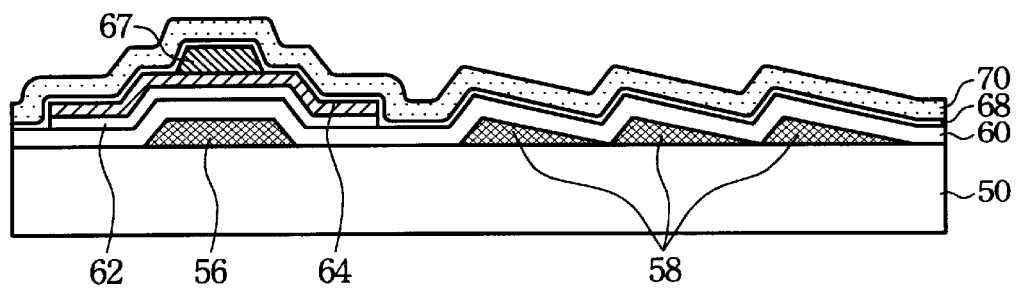
FIG. 5 is a cross sectional view of a transparent substrate illustrating the steps of defining the etching stopper and depositing the second metal layer in accordance with the present invention.
Figure 6:
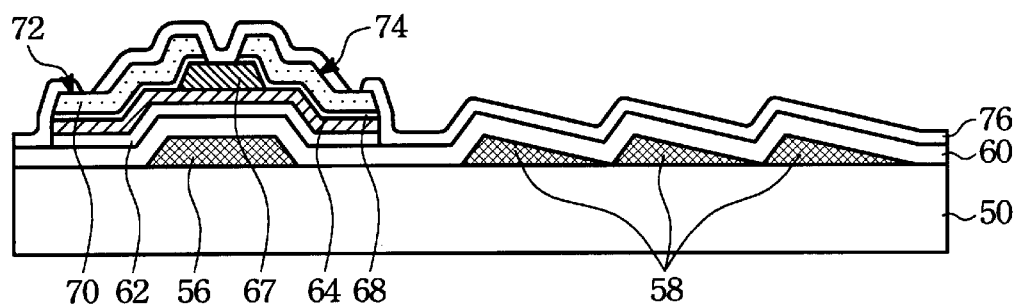
FIG. 6 is a cross sectional view of a transparent substrate illustrating the steps of defining the drain/source structures in accordance with the present invention.

And as shown in FIG. 5, an etching procedure is next performed to etch the second insulating layer 66 for defining an etching stopper 67 above the gate structure 56 and the semiconductor layer 64. Next a doped silicon layer 68 and a second metal layer 70 are formed on outer surfaces of the etching stopper 67, the semiconductor layer 64 and the first insulating layer 60. Then refer to FIG. 6, an etching procedure is performed to etch the second metal layer 70 and the doped silicon layer 68 for defining a source structure 72 and a drain structure 74 individually on the semiconductor layer 64 and aside the etching stopper 67. The etching stopper 67 is applied to prevent the semiconductor layer 64 from damage in the etching procedure. After defining the source structure 72 and drain structure 74, a passivation layer 76 is formed on the substrate 50, and an etching step is done to form contact holes to expose portions of the source structure 72 and the drain structure 74 for electrical connection.

Figure 7:
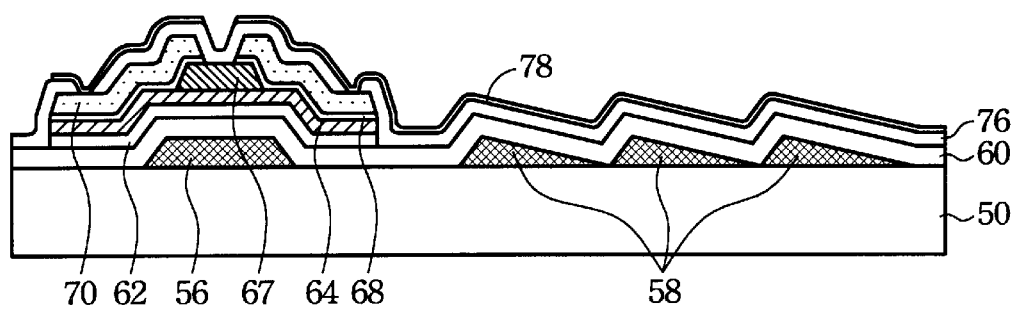
FIG. 7 is a cross sectional view of a transparent substrate illustrating the steps of forming the pixel electrode on the passivation layer in accordance with the present invention.

Refer to FIG. 7, a pixel electrode 78 is formed on the passivation layer 76 to electrical connect the drain structure 74. The materials with higher reflectivity, such as metal, can be applied to form the pixel electrode 78 because the pixel electrode 78 is also applied to serve as a reflection member in reflective type TFT-LCD devices. In a preferred embodiment, the pixel electrode 78 is made of aluminum. Notedly, there are the plural ridge bumps 58 defined in the area of the pixel electrode 78 in the first etching procedure. Therefore the first insulating layer 60 deposited later can duplicate the ridge shapes of the ridge bumps 58 to have the long inclined plane 60a and the short inclined plane 60b. And the passivation layer 76 still duplicates the responsive slant shapes. Thus the pixel electrode 78 also has the rising and falling surfaces to serve as rough diffusers.

Figure 8:
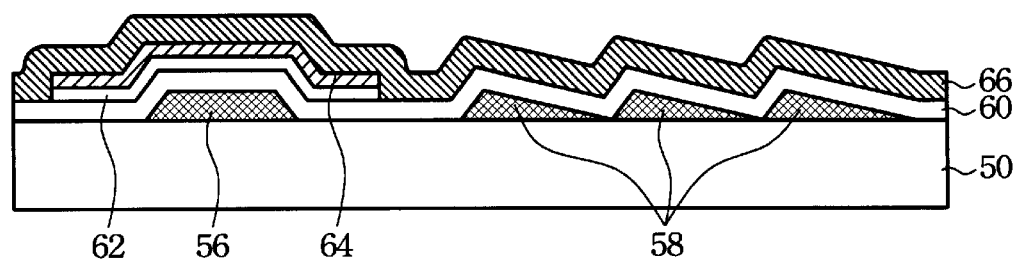
FIG. 8 is a cross sectional view of a transparent substrate illustrating the steps of depositing the second insulating layer on the ridge bumps in accordance with the second embodiment of the present invention.
Figure 9:
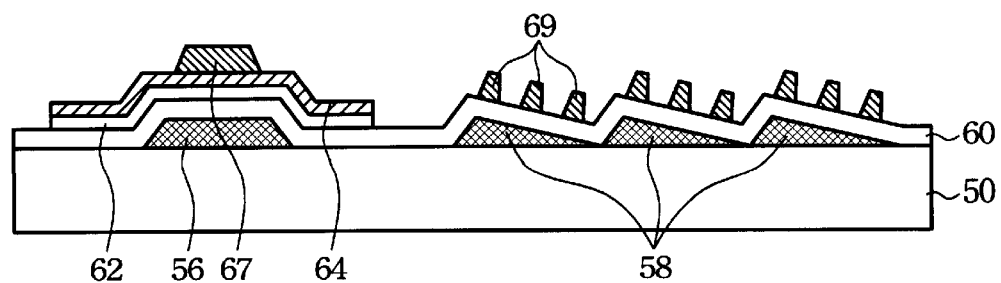
FIG. 9 is a cross sectional view of a transparent substrate illustrating the steps of defining the insulating protrusions on the first inclined plane of the first insulating layer in accordance with the second embodiment of the present invention.

The Second Embodiment:

Refer to FIG. 8, similar to the first embodiment above, the first metal layer is formed on the transparent insulator substrate 50 and then is etched by performing the first etching procedure to define the gate structure 56 and the ridge bumps 58 on the substrate 50. It is noted that the ridge bumps 58 are formed on the area where are applied to fabricate the pixel electrodes later. Then the first insulating layer 60 is deposited on the gate structure 56 and the substrate 50. And next the gate insulating layer 62 and the semiconductor layer 64 are defined on the first insulating layer 60 in sequence. The second insulating layer 66 is formed on the semiconductor layer 64 and the first insulating layer 60. Please refer to FIG. 9, an etching step is done to etch the second insulating layer 66 for defining the etching stopper 67 above the gate structure 56 and defining simultaneously plural insulating protrusions 69 on the first insulating layer 60 above the ridge bumps 58. The insulating protrusions 69 have pillar shapes are distributed on the long inclined plane 60a of the first insulating layer 60 with a predetermined interval. Surely under the consideration of process requirement, the insulating protrusions 69 can be spread on the short inclined plane 60a of the first insulating layer 60. And the insulating protrusions 69 can also be spread on both the long and short inclined plane 60a, 60b. Besides, the shape, size, space of the insulating protrusion 69 can be adjusted according to the requirements.

Figure 10:
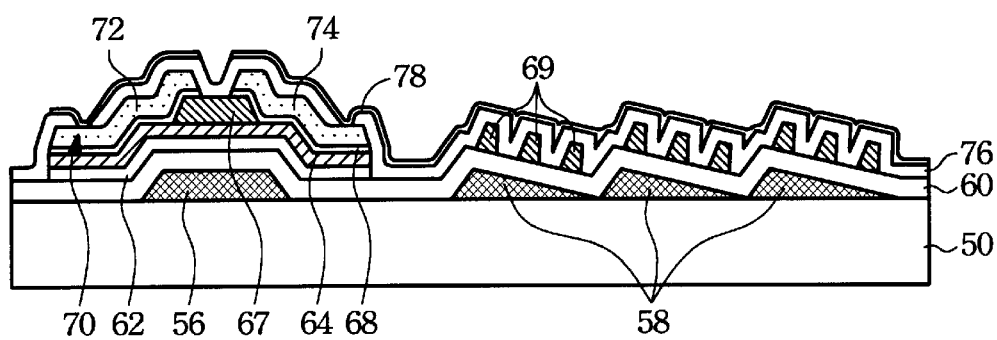
FIG. 10 is a cross sectional view of a transparent substrate illustrating the steps of forming the pixel electrode on the insulating protrusions in accordance with the second embodiment of the present invention.

Refer to FIG. 10, After defining the patterns of the second insulating layer 66, as described above in the first embodiment, the doped silicon layer 68 and the second metal layer 70 are then formed above the substrate 50. And an etching procedure is performed to define the source structure 72 and the drain structure 74 aside the etching stopper 67. The passivation layer 76 is subsequently formed on the thin-film transistor and the insulating protrusions 69. Then another etching step is done to expose portions of the source structure 72 and the drain structure 74. Next the pixel electrode 78 is formed on the passivation layer 76 to electrical connect the drain structure 74. Thus the insulating protrusions 69 are defined on the long inclined plane 60a of the first insulating layer 60 simultaneously when the etching stopper 67 is defined in the etching procedure. Similarly the passivation layer 76 formed above can duplicate the rough and uneven shapes. And the pixel electrode 78 deposited latter also has the rising and falling surface to serve as the rough diffuser. As shown in FIG. 10, the pixel electrode 78 can duplicate the shapes both of the ridge bumps 58 and the insulating protrusions 69 to make the roughness of the surface more concentrated.

The Third Embodiment

Figure 11:
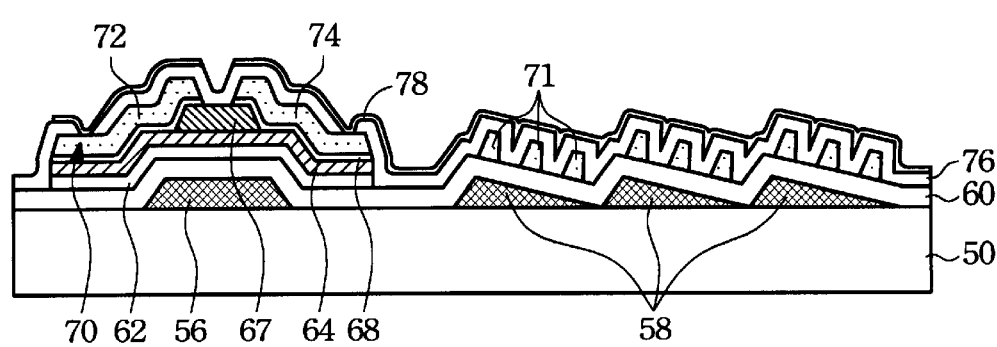
FIG. 11 is a cross sectional view of transparent substrate illustrating the steps of fabricating the metal protrusions to make the pixel electrodes have the rough and uneven surfaces in accordance with the third embodiment of the present invention.

Please refer to FIG. 11, as above descriptions, the first metal layer 52 is formed on the transparent insulator substrate 50 and then is etched by performing the first etching procedure to define the gate structure 56 and the ridge bumps 58 on the substrate 50 simultaneously. After depositing the first insulating layer 60 on the substrate 50, the gate insulating layer 62 and the semiconductor layer 64 are formed and defined. And the second insulating layer 66 is formed on the semiconductor layer 64 and the first insulating layer 60. Next an etching step is done to etch the second insulating layer 66 for defining the etching stopper 67 above the gate structure 56. The doped silicon layer 62 and the second metal layer are then formed above the substrate 50. And another etching procedure is performed to define the source structure 72 and the drain structure 74 aside the etching stopper 67, and simultaneously to define plural metal protrusions 71 on the first insulating layer 60 above the ridge bumps 58. These metal protrusions 71 with pillar shapes are spread on the long inclined plane 60a of the first insulating layer 60 with a predetermined interval. Surely the metal protrusions 71 can also be spread on the short inclined plane 60a of the first insulating layer 60 or be spread on both the long and short inclined plane 60a, 60b. Besides, the shape, size, space of the metal protrusion 71 can be adjusted according to the requirements.

After depositing and defining the passivation layer 76 on the thin-film transistor and the metal protrusions 71, the pixel electrode 78 is formed on the passivation layer 76 to electrical connect the drain structure 74. Thus the passivation layer 76 formed above the metal protrusions 71 and the first insulating layer 60 can duplicate the rough and uneven shapes. And the pixel electrode 78 deposited latter also can duplicate the rising and falling surface to serve as the rough diffuser. As shown in FIG. 11, the pixel electrode 78 can duplicate the shapes both of the ridge bumps 58 and the metal protrusions 71 to make the roughness of the surface more concentrated.

The Fourth Embodiment

Figure 12:
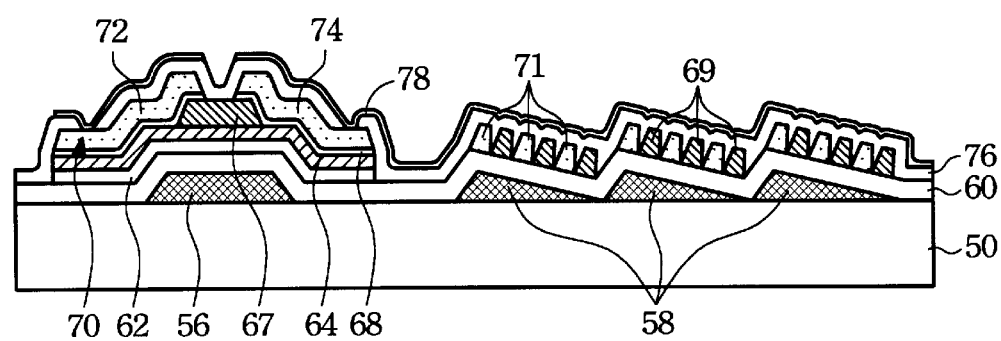
FIG. 12 is a cross sectional view of a transparent substrate illustrating the steps of forming the metal and insulating protrusions to make the pixel electrodes have the rough and uneven surfaces in accordance with the fourth embodiment of the present invention.

Refer to FIG. 12, it is noted that the plural insulating protrusions 69 are defined on the long inclined plane 60*a* simultaneously when the etching stopper 67 is defined by performing the etching step to etch the second insulating layer 66. Besides the plural metal protrusions 71 are also defined on the long inclined plane 60*a* simultaneously when the etching step for defining the source structure 72 and the drain structure 74 is performed. The metal protrusions 71 and the insulating protrusions 69 are interlaced distributed on the first insulating layer 60. Each metal protrusion 71 is located between two adjacent insulating protrusions 69. And comparatively each insulating protrusion 69 is located between two adjacent metal protrusions 71. As described above, the metal protrusions 71 and the insulating protrusions 69 can be spread on the short inclined plane 60*b* or spread on both the short and long inclined plane 60*b,a*. Besides the shapes, sizes, spaces of the metal and insulating protrusion 71, 69 can be adjusted according to the requirements. Thus the pixel electrode 78 formed later has the rising and falling surface to serve as the rough diffuser.

Figure 13:
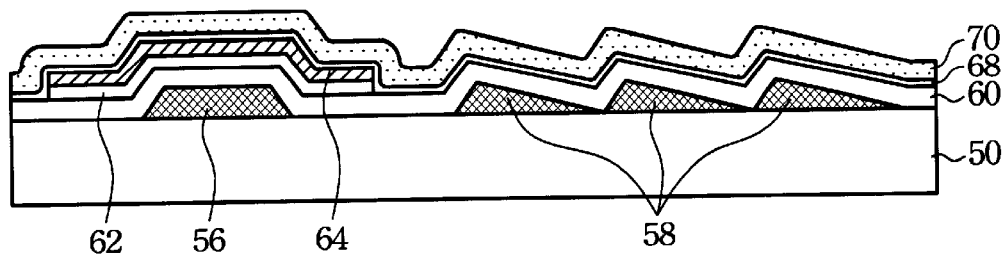
FIG. 13 is a cross sectional view of a transparent substrate illustrating the steps of applying the back channel etching procedures to form the thin film transistors in accordance with the present invention.
Figure 14:
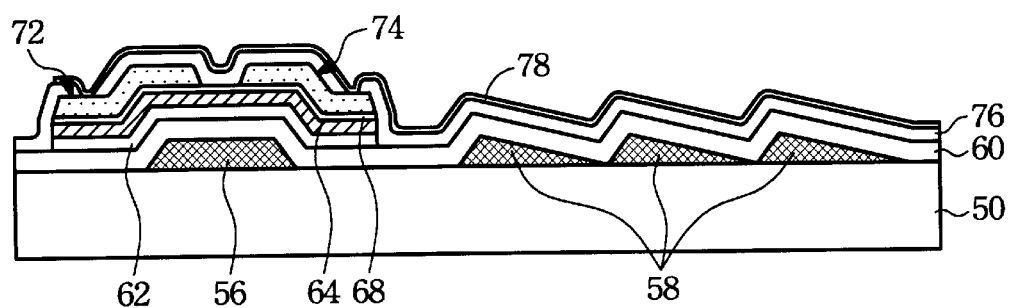
FIG. 14 is a cross sectional view of a transparent substrate illustrating the steps of forming the pixel electrodes on the passivation layer in accordance with the present invention.
Figure 15:
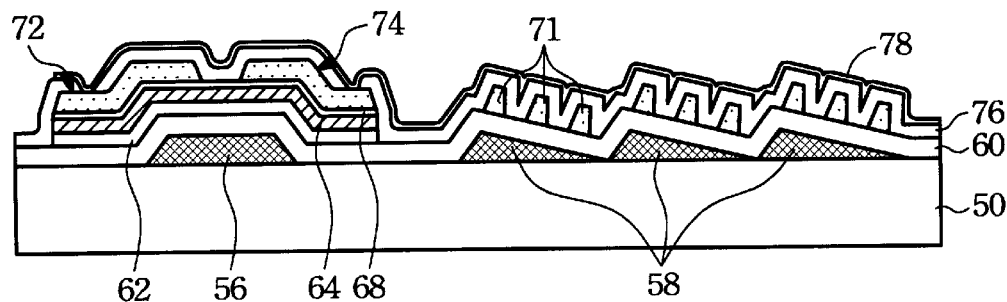
FIG. 15 is a cross sectional view of a transparent substrate illustrating the steps of forming the metal protrusions to make the pixel electrodes have the rough and uneven surfaces in accordance with the present invention.

Noted that the process of the invention mentioned above can also be applied to fabricate the back channel etching (BCE) type TFT-LCD devices. Refer to FIGS. 13–15, after defining the gate structure 56 and ridge bumps 58, the first insulating layer 60 is formed thereon. Then by the procedures of depositing films and lithography etching, the gate insulating layer 62 and the semiconductor layer 64 are formed and defined above the gate structure 56. Because it is not required to form the etching stopper in BCE process, the doped silicon layer 68 and the second metal layer 70 can be directly formed on the semiconductor layer 64 and the first insulating layer 60. As shown in FIG. 15, the source structure 72 and the drain structure 74 are defined on the semiconductor layer 64 by performing the BCE procedure to etch the second metal layer 70 and the doped silicon layer 68. Next the passivation layer 76 is deposited above the substrate 50 to uniformly cover the films and structures. And an etching procedure is done to define the contact hole in the passivation layer 76 to expose portions of the source structure 72 and the drain structure 74 for electrical connection. Subsequently the pixel electrode 78 is formed on the passivation layer 76 to connect the drain structure 74.

Besides the plural metal protrusions 71 can be applied to spread on the first insulating layer 60 above the ridge bumps 58 simultaneously in the etching step to define the source structure 72 and the drain structure 74, as shown in FIG. 15. These metal protrusions 71 with the pillar shapes are spread along the long inclined plane 60*a* of the first insulating layer 60 with a predetermined interval. The metal protrusions 71 can also be spread on the short inclined plane 60*a* of the first insulating layer 60 or be spread on both the long and short inclined plane 60*a*, 60*b*. And the shape, size, space of the metal protrusion 71 can be adjusted according to the requirements.

Figure 16:
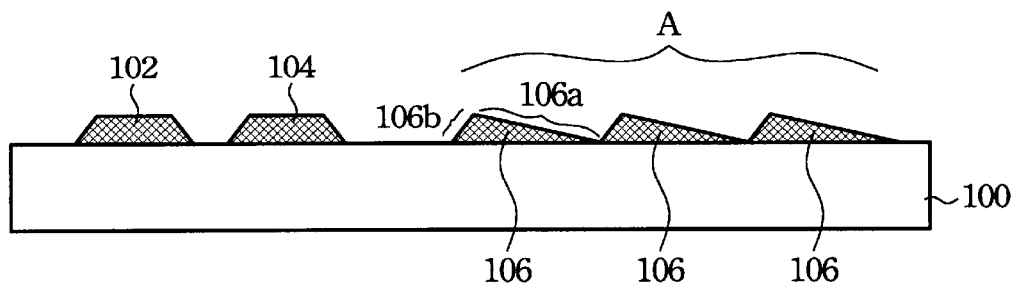
FIG. 16 is a cross sectional view of a transparent substrate illustrating the steps of applying the processes for fabricating the top-gate type transistors to define the drain/source and the ridge metal bumps in accordance with the present invention.
Figure 17:
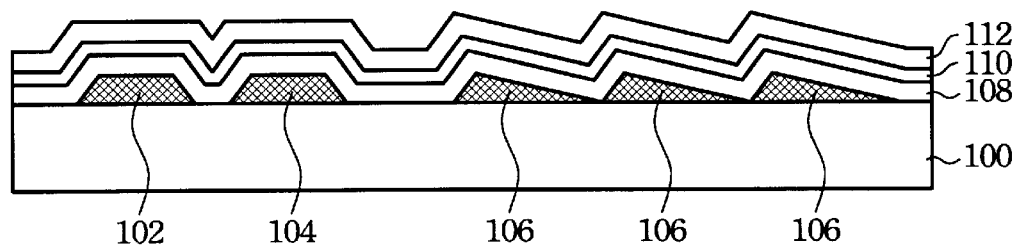
FIG. 17 is a cross sectional view of a transparent substrate illustrating the steps of forming the semiconductor layer, the insulating layer, and the second metal layer in accordance with the present invention.
Figure 18:
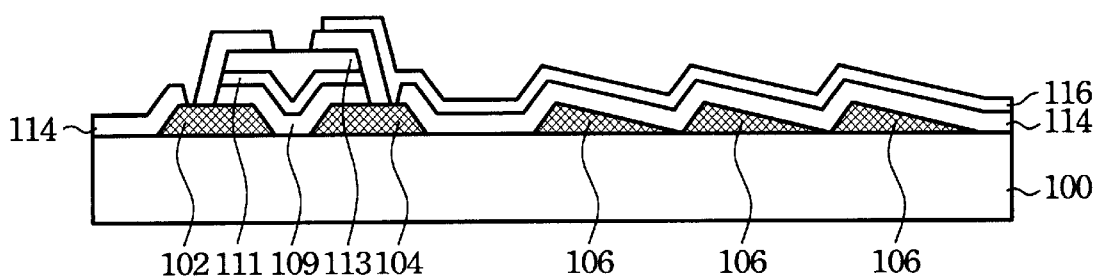
FIG. 18 is a cross sectional view of a transparent substrate illustrating the steps of forming the pixel electrodes on the passivation layer in accordance with the present invention.

Besides the process of the invention mentioned above can also be applied to fabricate the top gate type TFT-LCD devices. Refer to FIGS. 16–18, after depositing the first metal layer on a substrate 100, the first etching procedure is done to define a source structure 102, a drain structure 104, and ridge bumps 106 on the substrate 100. Plural ridge bumps 106 with long bevels 106*a* and short bevels 106*b* are formed in the areas for defining the pixel electrodes later. Refer to FIG. 17, an amorphous silicon layer 108, an insulating layer 110, and a first metal layer 112 are deposited in sequence on the source structure 102, the drain structure 104, the ridge bumps 106 and the substrate 100. The amorphous silicon layer 108 above is applied to define channels of transistors. And the insulating layer 110 is applied to serve as the gate insulator. In a preferred embodiment, the insulating layer 110 is chosen from a group of silicon oxide, silicon nitride and silicon oxynitride.

Please refer to FIG. 18, after depositing the films above, an etching procedure is done to etch the second metal layer 112, the insulating layer 110 and the amorphous silicon layer 108 to define individually a gate structure 113, a gate insulator 111 and a channel 109 on the source structure 102 and the drain structure 104. Then a thicker passivation layer 114 is formed above the substrate 100 to cover the gate structure 113, the gate insulator 111, the channel 109 and the ridge bumps 106. Similarly the passivation layer 114 is next etched to define contact holes therein to expose portions of the gate structure 113, the source structure 102 and the drain structure 104 for electrical connection. Subsequently the pixel electrode 116 is formed on the passivation layer 114 to connect the drain structure 104. Because there are plural ridge bumps formed in the area of defining the pixel electrode 116 in the first etching procedure to form the source structure 102 and the drain structure 104, the passivation layer 114 and the pixel electrode 116 can duplicate the ridge shapes. Thus the pixel electrode 116 can be applied to serve as the diffusers with required roughness.

Similarly for the purpose of promoting the efficiency of diffusers, plural protrusions are applied on the ridge metal bumps 106 in the etching step to define the gate structure 113, the gate insulating layer 111 and the channel 109. These protrusions have pillar structures stacked by the second metal layer 112, the insulating layer 110 and the amorphous silicon layer 108 arbitrarily, and are spread on the ridge metal bumps 106. For instance, the semiconductor protrusions formed of the amorphous silicon layer 112 can be fabricated on the long or short inclined plane 106*a*, 106*b* of the ridge bumps 106 in the step to etch the amorphous silicon layer 108 to define the channel 109. And for another example, after defining the channel 109 and the gate insulating layer 111, the second metal layer is deposited thereon and etched to define the gate structure 113 on the gate insulating layer 111 and define plural metal protrusions on the ridge bumps 106 simultaneously.

The present invention can provide various benefits. First, by fabricating the photoresists with slant ridge shapes, the ridge bumps formed in the first etching procedure can duplicate the slant shapes. Accordingly each ridge bump has the long bevel and the short bevel. And the pixel electrodes deposited thereon also have the long inclined plane responsive to the long bevel and can gather most reflected light in a specific angle for the purpose of promoting brightness of the TFT-LCD devices.

Besides cause the insulating and metal protrusions can be both applied to spread on the long inclined plane, the roughness of the pixel electrodes served as diffusers can be promoted to adequately reflect the outside illuminations. And noted there is no need to apply additional photo reticle and lithography processes to fabricate the above protrusions due to those protrusions are defined by performing the etching procedures of the original process. Accordingly the throughput of the TFT-LCD manufacture can be maintained when the pixel electrode diffuser is fabricated by applying the present invention. Further the shapes and the angles of rising and falling of surfaces of the pixel electrodes can be controlled by applying the ridge bumps, the insulating protrusions and the metal protrusions regularly. And the dimensions, shapes, locations and intervals of those ridge bumps and protrusions can be adjusted to control the light reflected angle and the roughness of the pixel electrode.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of forming a TFT-LCD device with a slant pixel electrode, the method comprises the following steps of:
   forming a first metal layer on a substrate and performing a first etching procedure to etch the first metal layer for defining a gate structure and plural ridge bumps on the substrate simultaneously wherein each the ridge bump has a first bevel and a second bevel;
   depositing a first insulating layer on the gate structure, the ridge bumps and the substrate, wherein the first insulating layer deposited on the first bevel has a first inclined plane and deposited on the second bevel has a second inclined plane;
   forming and defining a semiconductor layer on the first insulating layer above the gate structure to define a channel of the TFT-LCD;
   forming a second insulating layer on the semiconductor layer and the first insulating layer and performing a second etching procedure to etch the second insulating layer to define a stopper on the semiconductor layer above the gate structure;
   forming a second metal layer on the stopper, the semiconductor layer, and the first insulating layer and performing a third etching procedure to etch the second metal layer to define drain/source structures aside the stopper;
   forming and defining a passivation layer on the substrate to expose portions of the drain/source structures; and
   forming a pixel electrode on the passivation layer to electrically connect the drain/source structures.

2. The method of claim 1, wherein after forming the first metal layer further comprises the steps of:
   coating a photoresist layer on the first metal layer;
   performing a lithography procedure to define a gate pattern and plural ridge patterns on the photoresist layer;
   wherein the lithography procedure comprises a multi-exposure procedure and reticles applied to the lithography procedure can be chosen from a group of half tone reticles and slit reticles.

3. The method of claim 1, wherein plural insulating protrusions are defined on the ridge bumps simultaneously in performing the second etching procedure to etch the second insulating layer wherein the insulating protrusions are spread on the first inclined plane of the first insulating layer.

4. The method of claim 3, wherein plural metal protrusions are defined on the first insulating layer simultaneously in performing the third etching procedure to etch the second metal layer, wherein the metal protrusions and the insulating protrusions are interlaced distributed on the first inclined plane of the first insulating layer.

5. The method of claim 4, wherein each the metal protrusion is located between two adjacent insulating protrusions.

6. The method of claim 3, wherein the insulating protrusions are spread on both the first inclined plane and the second inclined plane.

7. The method of claim 6, wherein plural metal protrusions are defined on the first insulating layer simultaneously in performing the third etching procedure to etch the second metal layer, wherein the metal protrusions and the insulating protrusions are interlaced distributed on the first inclined plane and the second inclined plane of the first insulating layer.

8. The method of claim 1, wherein the first metal layer and the second metal layer are selected from a group of Al, Cr, Ti, W, Ta, Mo, alloy and combination thereof.

9. A method of forming a TFT-LCD device with a slant pixel electrode, the method comprises the following steps of:
   forming a first metal layer on a substrate and performing a first etching procedure to etch the first metal layer for defining a gate structure and plural ridge bumps on the substrate simultaneously wherein each the ridge bump has a first bevel and a second bevel;
   depositing a first insulating layer on the gate structure, the ridge bumps and the substrate, wherein the first insulating layer deposited on the first bevel has a first inclined plane and deposited on the second bevel has a second inclined plane;
   forming and defining a semiconductor layer on the first insulating layer above the gate structure to define a channel of the TFT-LCD;
   forming a second metal layer on the semiconductor layer and the first insulating layer and performing a second etching procedure to etch the second metal layer to define drain/source structures;
   forming and defining a passivation layer on the substrate to expose portions of the drain/source structures; and
   forming a pixel electrode on the passivation layer to electrically connect the drain/source structures.

10. The method of claim 9, wherein after forming the first metal layer further comprises the steps of:
    coating a photoresist layer on the first metal layer;
    performing a lithography procedure to define a gate pattern and plural ridge patterns on the photoresist layer;
    wherein the lithography procedure comprises a multi-exposure procedure and reticles applied to the lithography procedure can be chosen from a group of half tone reticles and slit reticles.

11. The method of claim 9, wherein plural metal protrusions are defined on the ridge bumps simultaneously in performing the second etching procedure to etch the second metal layer.

12. The method of claim 11, wherein the metal bumps are spread with predetermined intervals on the first inclined plane of the first insulating layer.

13. The method of claim 9, wherein the first metal layer and the second metal layer are selected from a group of Al, Cr, Ti, W, Ta, Mo, alloy and combination thereof.

14. A method of forming a TFT-LCD device with a slant pixel electrode, the method comprises the following steps of:

forming a first metal layer on a substrate and performing a first etching procedure to etch the first metal layer for defining drain/source structures and plural ridge bumps on the substrate simultaneously wherein each the ridge bump has a first bevel and a second bevel;

forming a semiconductor layer on the drain/source structures, the ridge bumps and the substrate;

forming an insulating layer on the semiconductor layer;

forming a second metal layer on the insulating layer;

performing a second etching procedure to etch the second metal layer, the insulating layer, and the semiconductor layer to define a gate structure, wherein the semiconductor layer is applied to serve as a channel of the TFT-LCD device;

forming and defining a passivation layer on the substrate to expose portions of the drain/source structures; and forming a pixel electrode on the passivation layer to electrically connect the drain/source structures.

15. The method of claim 14, wherein after forming the first metal layer further comprises the steps of:

coating a photoresist layer on the first metal layer;

performing a lithography procedure to define drain/source pattern and plural ridge patterns on the photoresist layer;

wherein the lithography procedure comprises a multi-exposure procedure and reticles applied to the lithography procedure can be chosen from a group of half tone reticles and slit reticles.

16. The method of claim 14, wherein plural protrusions are defined on the ridge bumps simultaneously in performing the second etching procedure, wherein each the protrusion is formed by stacking the second metal layer, the insulating layer and the semiconductor layer.

17. The method of claim 14, wherein plural metal protrusions are defined on the ridge bumps simultaneously in the second etching procedure.

18. The method of claim 14, wherein plural semiconductor protrusions are defined on the ridge bumps simultaneously in the second etching procedure.

19. The method of claim 14, wherein the first metal layer and the second metal layer are selected from a group of Al, Cr, Ti, W, Ta, Mo, alloy and combination thereof.

* * * * *